United States Patent [19]

Batchie

[11] 4,432,731
[45] Feb. 21, 1984

[54] BOMB SQUAD TRAINING DEVICE

[76] Inventor: John M. Batchie, 56 Longview Ave., White Plains, N.Y. 10605

[21] Appl. No.: 432,062

[22] Filed: Sep. 30, 1982

[51] Int. Cl.³ .............................................. G09B 9/00
[52] U.S. Cl. ...................................................... 434/11
[58] Field of Search ................ 434/11; 273/1 R, 1 E, 273/1 GA, 1 GC, 237

[56] References Cited

U.S. PATENT DOCUMENTS

| | | | |
|---|---|---|---|
| 3,540,136 | 11/1970 | Billingsley | 434/11 |
| 3,737,168 | 6/1973 | Driskill | 273/1 E |
| 4,014,111 | 3/1977 | Miller | 434/11 |
| 4,103,890 | 8/1978 | Treasarden | 273/1 E |
| 4,320,901 | 3/1982 | Morrison et al. | 273/1 GC X |

Primary Examiner—William H. Grieb

[57] ABSTRACT

A bomb squad training device comprising a portable triggerable, simulated explosive device in a relatively small unit such as an attache case, which produces one or more selective electrical signals when the triggerable act occurs which are received at a similarly portable console containing triggering identification and storage means.

10 Claims, 6 Drawing Figures

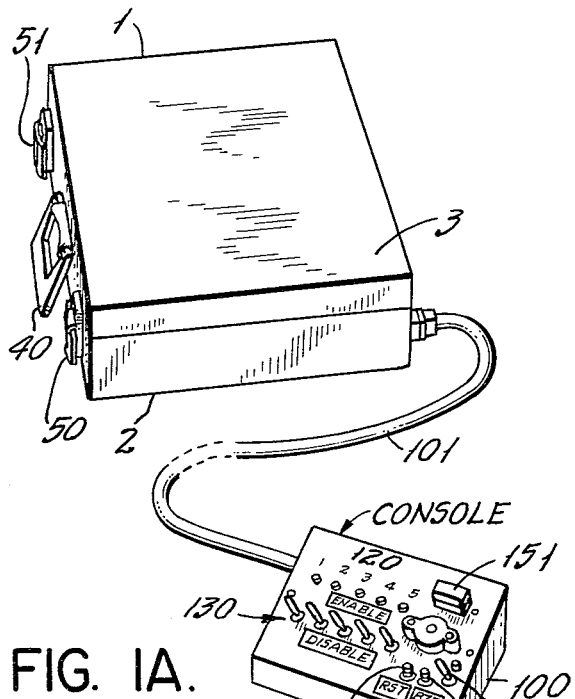
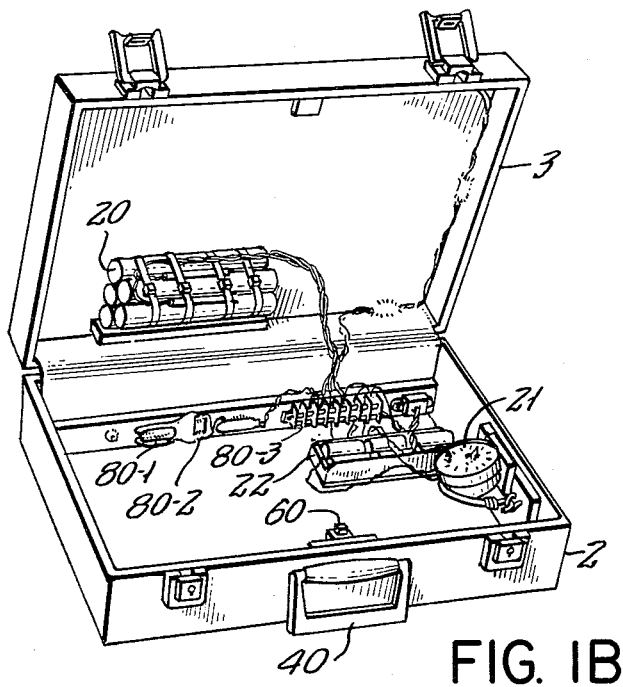
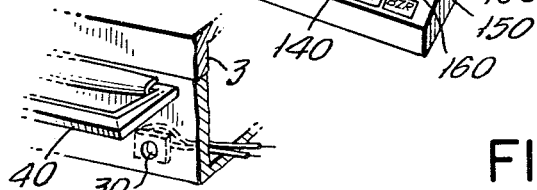
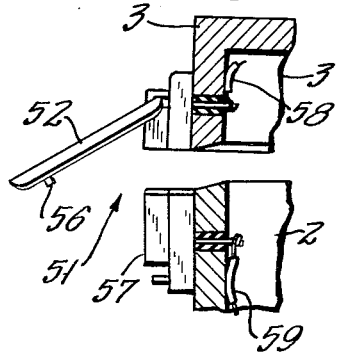
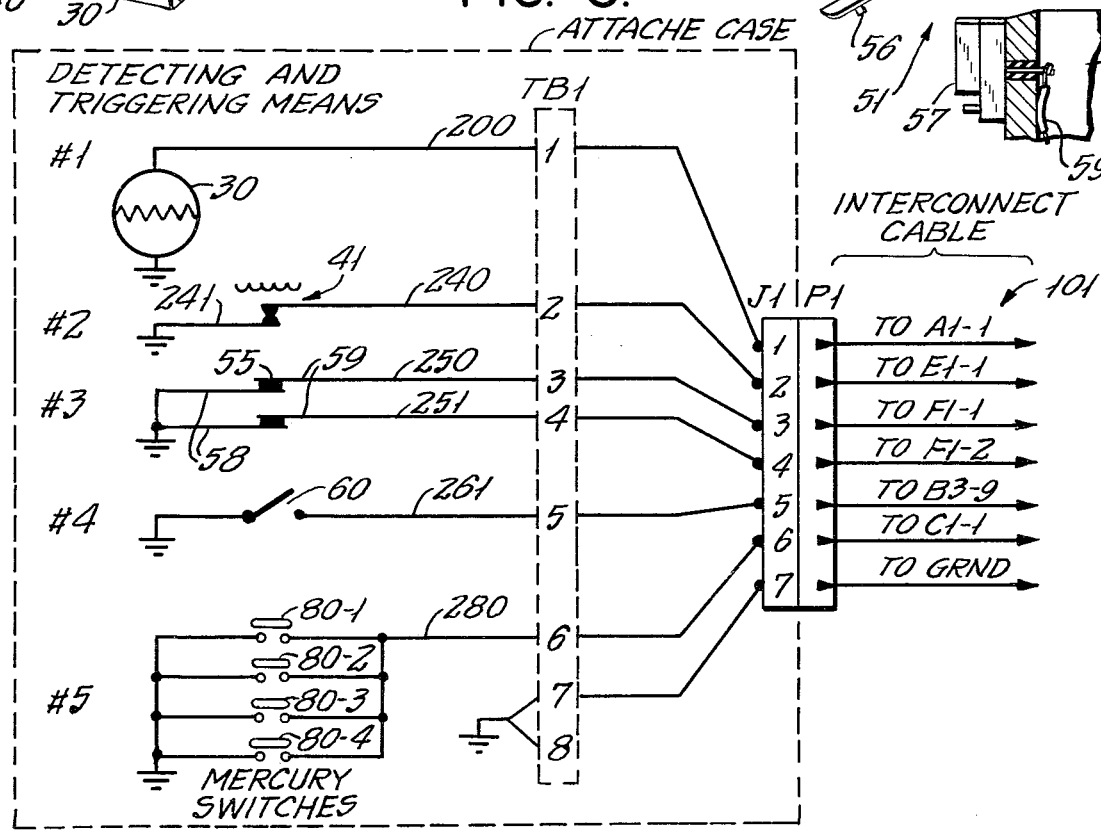

BOMB SQUAD TRAINING DEVICE

BACKGROUND OF THE INVENTION

This invention relates to a bomb squad training device.

More particularly, the invention relates to a system and device for training primarily law enforcement personnel in the proper care of handling a suspected explosive device. More specifically, my invention uses a portable device having a simulating bomb and triggering means and an instructors console providing information and indications of signals simulating explosions.

OBJECTS AND SUMMARY OF THE INVENTION

It is the object of the invention to provide a bomb squad training device for use by bomb squad personnel, public safety training officers, and security supervisors in instructing personnel as to the importance of not handling a suspected explosive device, and to immediately summon qualified experts.

It is another object of this invention to provide a simple, portable bomb squad training device which simulates triggering and bomb explosion by providing one or more signal indications at a separable or remote console unit.

It is a further object of this invention to provide a simple, portable, simulated anti-personnel explosive device in an enclosed carrier such as an attache case forming part of the bomb squad training device. The simulated device detects and is actuated by one or more acts of personnel and is sensitive to movement of the attache case, or to light resulting from attempts to inspect or open the attache case.

Briefly, this invention comprises a portable simulated triggerable bomb or explosive in a portable enclosed unit such as an attache case, and a separate sensing and indicating console which preferable includes the power source. The console and connecting cable is preferably hidden.

The explosive has a triggering assembly circuitry or means to provide a control signal simulating a triggering explosive signal. Detecting means responsive to light, movement of the attache case or any part thereof are attached to the attache case and are coupled to said triggering assembly means. The sensing console responds to the simulated explosive signal to provide an indication of a dangerous personnel act responsible for the simulated explosive condition and information as to the act or acts which are to be avoided.

The above mentioned and other features and objects of this invention and the manner of obtaining them will become more apparent and the invention itself will best be understood by reference to the following description of embodiments of the invention taken in conjunction with the accompanying drawing, the description of which follows.

BRIEF DESCRIPTION OF THE DRAWING

FIG. 1 is a perspective drawing illustration of a preferred embodiment showing the attache case and the power console;

FIG. 1A is a partial perspective drawing of the attache case of FIG. 1 with the handle of the attache case raised;

FIG. 1B is a partial perspective drawing of the attache case of FIG. 1 with the lid raised slightly and a latch open illustrating the make-break connection;

FIG. 2 is a perspective drawing of the attache case showing a simulated, dummy time bomb and certain sensing elements;

FIG. 3 is a circuit diagram of the wiring and elements used in the attache case.

STATEMENT OF THE INVENTION

Figure 4:
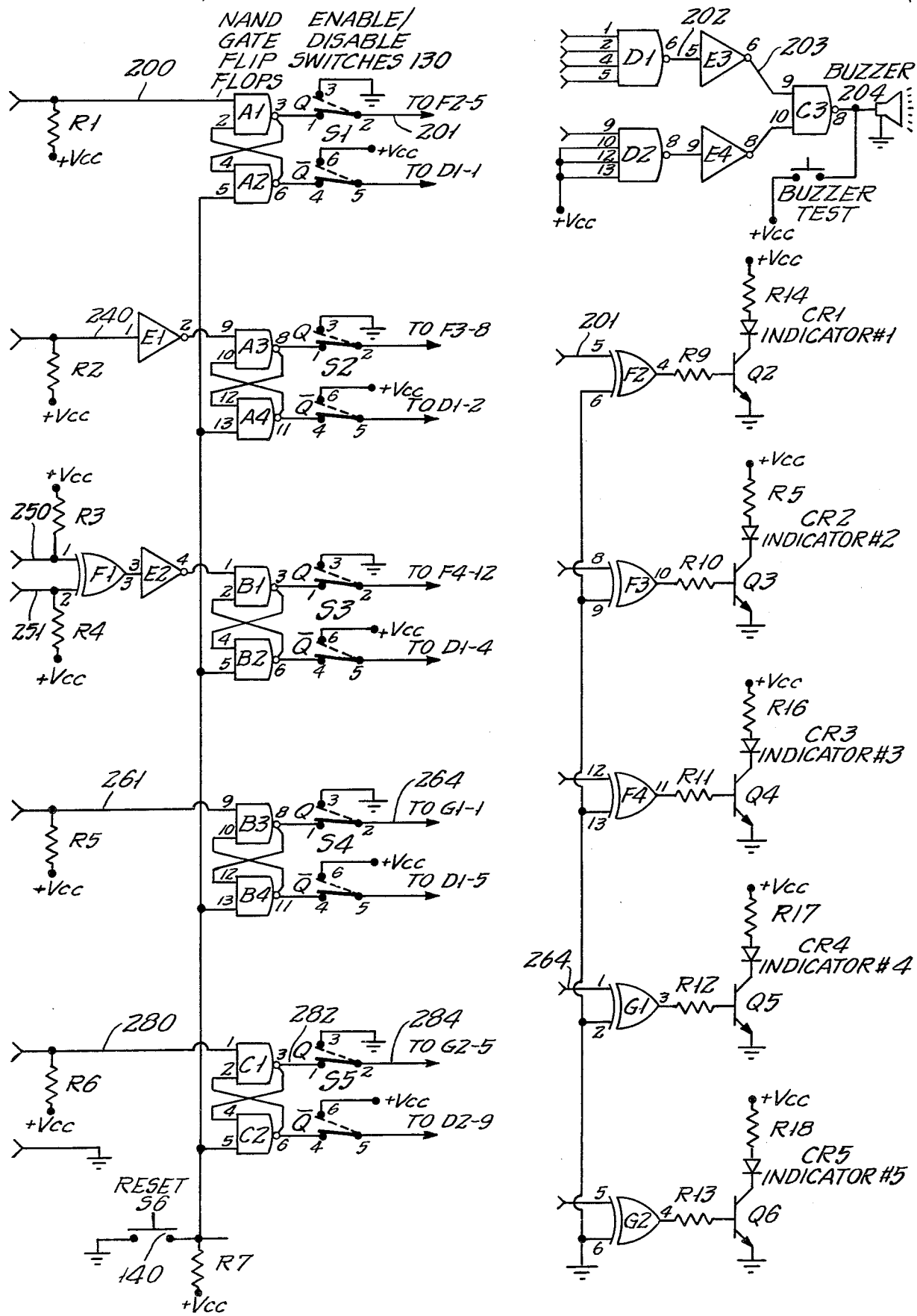
FIG. 4 is a circuit diagram of the wiring and element used in the console of FIG. 1.

As shown in FIG. 1, the invention in its preferred embodiment comprises a simulated explosive device carrier such as an attache case having a bottom 2 and lid 3 and latches 50, 51 and a separate console 100.

Mounted internally in the case for demonstration of authenticity, is a wind-up alarm clock 21 altered in such a fashion as to demonstrate the capability of a maximum 12-hour timing device. The clock hands are modified where the hour hand can be set to a maximum of 12 hours. At the end of the timing cycle, the hour hand will make contact with a screw mounted through the clock fact shield. Connected to the screw are two red wires, one routed to the positive side of powering means, here a 6 "C" cell battery pack 22, the other red wire connected to two dummy blasting caps in parallel. Two wires are attached to the metal clock housing, one routed to the negative side of the battery pack, the other also to the two blasting caps in parallel. The blasting caps are affixed to five dummy sticks of dynamite 20.

The attache case is equipped with multiple triggering or detecting devices that will be indicated at the console when triggered or activated. Five are discussed in this embodiment although it will be understood that other triggering devices may be used or some may be eliminated. These devices simulate various methods of detonating explosives within the case if it were to be an actual bomb device. The devices are wired internally in the case and are connected to the jack that mates with the control console interconnect cable. The triggering devices are as follows:

1. One photocell: a cadium sulphide photocell 30 mounted at the top of the case. When average room light is exposed to the cell, the control console will indicate triggering of this device.

2. One carrying handle: if the handle 40 is lifted off of the surface of the top of the case, specifically approximately ¼", a magnet installed in the handle will release and open an internally mounted glass reed switch underneath the magnet area of the handle. This triggering device will also be indicated as triggered at the console.

3. Two latches: if the arm 52 (FIG. 1B) of either latch 50, 51 is lifted just enough to break contact 55 (FIG. 3) with its associated striker plate 57, the connection made between lines 58, 59 will be broken and the console will indicate activation of this device.

4. One seam switch: a normally open micro switch 60 is installed at the top seam of the case, preferably internally centered below the carrying handle. If the case is opened approximately ⅛", the switch will close, causing indication of triggering at the console.

5. Four mercury switches: four quadrature arranged normally open mercury switches 80-1 to 80-4 are mounted on the bottom of the case, when in the upright position. The four devices are parallel wired so that any one, when closed, will complete the circuit. When in the upright position, if the case is lifted a specific amount, here approximately ¾" at either end, or is tilted frontwards or backwards, an associated mercury switch will close, indicating such triggering at the control console.

Instructors Console

The instructors console 100 remotely controls the triggering devices in the attache case. Preferably it and the interconnecting cable should be hidden so that it protects the realism of the attache case, although this is not necessary and the system can be used with the console in full view with the persons being trained knowing of the purpose and functions of the invention. It contains the power supply, solid state circuitry, LED indicators, a sonic alarm, enable/disable switches, reset switch, battery indicator, off-on switch, and buzzer test switch. The following is a functional description of the components of the preferred embodiment comprising the console:

1. Battery Power Supply: A 7.5 V 400 mah NICAD rechargeable battery pack is utilized. It is mounted internally in the console. Battery pack recharging is accomplished by connecting 7.5 V battery charger by means of a miniature phono plug receptacle located on the rear panel of the console.

2. Digital Circuitry: A printed circuit board is mounted internally on the bottom panel of the console. The circuitry consists of digital logic integrated circuits, switching transistors and resistors. The digital circuitry is TTL type with a +5 volt Vcc supplied by a 5 volt regulator integrated circuit. The regulator circuit also powers the transistor collectors, LEDs, and the enable/disable switches. The circuitry receives the activating of the case triggering devices, illuminates indicating LEDs, and sounds the sonic alarm. A detailed circuit analysis will be explained later in this disclosure.

3. Five indicating LEDs: There are five red LEDs mounted on the top panel of the console. The LEDs labeled 120 are numbered one through five to correspond with each of the five case triggering devices. Upon triggering of each case device, the associated LED will illuminate.

4. One sonic alarm: A piezo solid state buzzer is mounted on the top panel of the console. The buzzer is common to all five case triggering devices. Upon triggering of any of the five devices, the buzzer will sound.

5. Five enable/disable switches: Five double pole double throw (DPDT) switches, S1 to S5, shown at 130 FIG. 1 and 4, are mounted on the top panel of the console. Each switch is mounted directly below a red indicator LED. The switches are assigned to enable/disable function for the corresponding LED triggering device numbered above the LED above each switch. With a switch in the "up" or enable position, the circuitry controlling the assigned triggering device is allowed to complete its function of illuminating the LED, and sounding the buzzer. In the "down" or disable function, the assigned circuitry for a triggering device will complete its function with the exception of driving the LED indicator and sounding the buzzer. The LED and buzzer drive will be held in storage. The storage function will be detailed in the circuit analysis.

6. Reset Switch: A normally open momentary switch S-6 shown at 140 is mounted on the top panel of the console and functions as a reset switch. The purpose of this switch is to (a) reset the digital circuitry to proper logic levels after applying power, and (b) reset the circuitry, extinguish the LED indicators, and to mute the buzzer after triggering of the case devices.

7. On/Off Switch: A SPST switch 150 is mounted on the top panel of the console to connect the power or battery voltage Vcc to the circuit. The power supply is conventional and not otherwise shown. When the switch is flipped in the "up" or "on" position, battery voltage is applied to the 5v regulator IC, a green LED connected through a resistor to the "on" side of the switch is illuminated, and also from the "on" side of the switch, battery voltage is applied to a battery condition panel meter 151 mounted also on the top of the console. The meter face is shaded in two colors: green and red. When power is applied to the circuitry, the meter needle will indicate the battery condition as follows:

in green area: safe reliable operation
in red area: unreliable or no operation

8. Buzzer Test Switch: A N.O. momentary switch 160 is mounted on the top panel of the console directly to the right of the reset switch. When power is applied to the circuitry, the buzzer can be tested by depressing the switch.

Circuit Analysis

Referring now to FIGS. 3 and 4, the following circuit analysis will be a detailed explanation of the circuit functions in reference to each case triggering device.

I. When power is applied to the circuitry, the manual reset switch 140 is manually depressed, applying a low logic level to pin 5 of flip flop A2, pin 13 of flip flop A4, pin 5 of flip flop B2, pin 13 of flip flop B4 and pin 5 of flip flop C2. This resets Nand gate flip flops A1-A2, A3-A4, B1-B2, B3-B4 and C1-C2.

With enable/disable switches S1 through S5 in the enable position, the following sequence will occur when each case triggering device is activated.

(a) Photocell: one lead of the photocell 30 is connected to circuit ground. The other lead is connected to pin 1 of A1 by way of the wire 200 of the interconnect cable 101 in the attache case.

It is understood that references to wire color and specific values of electrical elements or specific circuits is to help describe this specific embodiment and for illustration purposes only. Further, the references to pin numbers will be understood by a person skilled in the art.

When the photocell is exposed to darkness, its resistance to ground is in excess of 100K ohms. Therefore, pin 1 is at a high logic level through R1. Upon exposing the cell to average room light, the resistance to ground falls to approximately 75 ohms, sufficient enough to cause a low level at pin 1 of A1. Flip flop A1-2 now "sets". Output Q goes high, output $\bar{Q}$ goes low. The high at Q is connected over lead 201 through switch S1-1&2 to pin 5 of exclusive or gate F2, with pin 6 of F2 at a constant low or ground, the complementary inputs produce a high output at pin 4, which in turn turns on switching transistor Q2 to provide a ground path for indicating LED CR2 illuminating same.

The low $\bar{Q}$ output of flip flop A1-2 is connected through switch S1-4&5 to pin 1 of dual quad input Nand gate D1, producing a high output at pin 6, lead 202 which is inverted by E3 to a low at pin 9, lead 203 of Nand gate C3. Assuming a high at pin 10 of C3 a high output is produced at pin 8, lead 204 of C3 causing the buzzer to sound.

The above circuitry will remain in this state until reset switch S6 140 is depressed to reset the flip flops, or the enable/disable switch S1 can be switched to "disable". This will turn off the LED and mute the buzzer. The triggered state of the circuit specifically the flip flops A1 and A2 will remain in storage for interrogation via the enable/disable switch. This means of resetting or storing will apply identically to the following triggering circuit analysis.

(b) Carrying Handle: with the handle resting on the top surface of the case, the magnet installed within the handle holds the N.O. glass reed switch 41 closed. One lead 241 of the switch is connected to circuit ground, the other to pin 1 of inverter E1 by way of a wire in the interconnect cable 101. In this position, a low logic level or voltage is maintained at E1-1 through R2.

When the handle is lifted off of the case surface, the reed switch opens causing E1-1 to go high through R2 inverted by E1, and producing a low at pin 9 of A3. The flip flop sets, Q goes high, $\overline{Q}$ goes low.

The high at Q is connected through S2-1&2 to pin 8 of F3. The complementary inputs produce a high output at pin 10 turning on Q3 and illuminating LED CR2.

The low at $\overline{Q}$ of flip flop A3-4 is connected through S2-4&5 to pin 2 of D1 producing a high output at pin 6, inverted by E3 to a low at pin 9 of C3. Assuming a high at pin 10 of C3, a high is produced at output pin 8 over lead 204 sounding the buzzer.

Circuit resetting is described above.

(c) Latches: when both latches 55 are securely closed, one side of each is connected to circuit ground in parallel. The other side of each latch is connected to leads 250, 251 to pin 1&2 of exlusive or gate F1 respectively by a brown and blue wire of the interconnect cable 101.

With both handles in this position, a low logic level is maintained at F1-1&2 through R3 and R4.. The output of F1 is low and inverted by E2 keeping flip flop B1-2 reset.

With either latch lifted off its respective striker plate, the circuit will trigger. Assume the latch connected to one of the wires 250 or 251 is lifted: pin 1 of F1 will go high through R3, with pin 2 remaining low the complementary inputs produce a high output at pin 3, the high will be inverted by E2 applying a low at pin 1 of B1. Flip flop B1-2 "sets". Q goes high, $\overline{Q}$ goes low.

The high at Q is connected through S3-1&2 to pin 12 of F4. The complementary inputs cause a high output at pin 11, turning on Q4 and illuminating LED CR3.

The low at $\overline{Q}$ is connected through S3-4&5 to pin 4 of D1 producing a high output at pin 6, inverted by E3 and a low is applied to pin 9 of C3. Assuming a high at pin 10, a high is produced at output pin 8 sounding the buzzer.

Circuit resetting is described above.

(d) Seam Switch: with the attache case closed, a N.C. micro switch 60 at the seam is held open. One lead of the switch is connected to circuit ground, the other lead is connected to pin 9 of B3 by way of the wire 261 in the interconnect cable.

In this position, pin 9 of B3 is high through R5.

When the case is opened, pin 9 goes low through R5. Flip flop B3-4 sets. Q goes high, $\overline{Q}$ goes low.

The high at Q is connected over lead 264 through S4-1&2 to pin 1 of G1. The complementary inputs cause a high output at pin 3 turning on Q5 and illuminating LED CR4.

The low at $\overline{Q}$ is connected through S4-4&5 to pin 5 of D1 producing a high output at pin 6, inverted by E3 and a low is applied to pin 9 of C3. Assuming a high at pin 10, a high is produced at output pin 8, sounding the buzzer.

Circuit resetting is described above.

(e) Mercury Switches: four N.O. mercury switches 80-1 to 80-4 are mounted at the bottom of the case. One lead of each are paralleled together and connected to pin 1 of C1 by way of the wire 280 in the interconnect cable to 101.

When the case is level and all mercury switches are open, pin 1 of C1 is high through R6 and lead 280.

If the case is tilted in any way, one of the switches will close causing pin 1 of C1 to go low through R6. Flip flop C1-2 "sets". Q goes high at lead 282, $\overline{Q}$ goes low.

The high at Q is connected over lead 284 through S5-1&2 to pin 5 of G2. The complementary inputs produce a high output at pin 4 turning on Q6 illuminating LED CR5.

The low at $\overline{Q}$ is connected through S5-4&5 to pin 9 of D2 producing a high output of pin 8, inverted by E4 and a low is applied to pin 10 of C3. Assuming a high at pin 9, output pin 8 goes high sounding the buzzer.

Circuit resetting is described above.

II. Enable/Disable Switches:

Enable/disable switches 130, S1 through S5 operate identically.

Switch S1 will be used as an example. A double pole double throw switch is utilized. In the enable position, Q from pin 3 of A1 is passed through terminals 1-2 to complete the switching functions to illuminate the LED CR1.

$\overline{Q}$ from pin 6 of A2 is passed through terminals 4&5 to complete the switching functions to sound the buzzer.

In the disable function, the flip flop still operates but is inhibited from completing the circuit function. Q and $\overline{Q}$ are connected to open terminals 1&4 respectively. They will remain in their respective states until reset by S6. This provides the storage function.

The circuit functions to illuminate the LED CR1 and sound the buzzer are inhibited as follows:

In the disable function, pin 5 of F2 is connected to ground through terminals 2&5 of S1. With pin 5 at a low level and pin 6 at a constant low, the output of pin 4 is low preventing Q2 to turn on and LED CR1 remains off.

Additionally, pin 1 of D1 is connected to a power supply Vcc (not shown) (+5 v) through terminals 5&6 of S1. With pin 1 at a high level, flip flop A1-2 cannot cause a change in the output of D1-6 to sound the buzzer.

Interrogation of the circuit state is accomplished by switching S1 to the enable position. Q and $\overline{Q}$ are now connected to the LED and buzzer circuitry. If the case device was triggered, the led will illuminate and the buzzer will sound.

For purposes of completeness of disclosure of the preferred embodiment, I identify the specific circuit elements as follows:

Integrated circuits A1 through 4, B1 through 4, C1 through 3 (4th Gate Unused) are 74L00 Quad Dual Input Nand Gates. Integrated circuits E1 through 4 (5th, 6th Gate Unused) are 74L04 Hex Inverters. Integrated circuits F1 through 4, G1 through 2 (3rd, 4th Gate Unused) are 74L86 Quad Dual Input Exclusive or Gates. Integrated circuits D1 through 2 are 74L20 Dual Quad Input Nand Gate. Q1, 2, 3, 4, 5, 6 are 2N222 Transistors. CR1, 2, 3, 4, 5 are general purpose red LED's. CR6 is a general purpose green LED. The resistors are as follows: R1=1K ohms; R2-R6=10K ohms; R7=5.6K ohms; R9-R13=4K ohms; R14-R18 =470 ohms.

While the principals of the invention have been described in connection with specific apparatus, it is to be clearly understood that this description is made only by way of example and not as a limitation to the scope of the invention as set forth in the objects thereof and in the accompanying claims.

What is claimed is:

1. A training system for personnel dealing with explosives comprising:
   a portable enclosed unit comprising simulated explosive means having triggering assembly means including detecting means responsive to at least one of movement of said unit or impingement of light on said unit to provide at least one control signal, whereby said detecting means provides a control signal simulating a triggering explosive signal;
   a separate, remotely coupled sensing console;
   said sensing console including identification means coupled to said triggering assembly means responsive to at least one of said simulated explosive signals, including indicating elements to provide an indication of a simulated explosive condition.

2. The system of claim 1 in which said triggering assembly means contains plural logic element means, each producing an output upon the presence of a detected signal.

3. The system of claim 1 in which said light responsive means is a photocell and in which said movement responsive means includes a plural orthogonal mercury switches.

4. The system of claim 2 in which said indication means comprises a plurality of circuits, each responsive respectively to the output of plural logic element means to produce indication signals.

5. The system of claim 4 in which said identification means includes storage means to store the output before transmitting to said indicating element.

6. The system of claim 4, including enable and disable means including switch means to place said circuit in an enable state so that the output in the storage means is passed to the indicating element.

7. A training system for personnel dealing with explosives comprising:
   a portable enclosed means comprising simulating explosive means having triggering assembly means including at least one of:
     (a) mercury switches responsive to movement producing a first control signal indicative of movement;
     (b) a photocell responsive to light and producing a second control signal responsive to light;
     (c) a switch in the seam of said portable means, responsive to opening of said portable means to produce a third control signal responsive to opening said means;
     (d) latch switch means coupled to said portable means responsive to opening a latch of said portable means to produce a fourth control signal responsive to latch opening;
   a separate sensing console;
   coupling means for transferring said control signals to said coupling means; at least one of:
     (a) a first storage means comprising a multistable means to produce an indicating voltage in response to said first control signal;
     (b) a second storage means comprising a multistable means to produce an indicating voltage in response to said second control signal;
     (c) a third storage means comprising a multistable means to produce an indicating voltage in response to said third control signal;
     (d) a fourth storage means comprising a multistable means to produce an indicating voltage in response to said fourth control signal;
   separate indicating devices coupled to each of first through fourth storage means; and
   plural indicating circuit means to transfer said indicating signal to respective indicating devices.

8. The system of claim 7, including enable and disable means to control the transfer of said indicating voltage signals to said indicating circuit means.

9. The system of claim 8, in which said enable and disable means comprises a switch having two positions, the enable position allowing direct transfer of said indicating voltage, and the disable position preventing transfer, whereby said indicating voltage signals remain stored when the switch is in the disabled position until the switch is put in the enable position.

10. The system of claim 8 in which the portable enclosed means is an attache case.

* * * * *